United States Patent [19]
Udd

[11] Patent Number: 4,898,468
[45] Date of Patent: Feb. 6, 1990

[54] SAGNAC DISTRIBUTED SENSOR
[75] Inventor: Eric Udd, Huntington Beach, Calif.
[73] Assignee: McDonnell Douglas Corporation, Long Beach, Calif.
[21] Appl. No.: 208,982
[22] Filed: Jun. 20, 1988
[51] Int. Cl.⁴ ............................................. G01B 9/02
[52] U.S. Cl. ..................................... 356/345; 356/349
[58] Field of Search ........................ 356/345, 350, 349
[56] References Cited

U.S. PATENT DOCUMENTS

| | | | |
|---|---|---|---|
| 4,375,680 | 3/1983 | Cahall et al. | 356/345 X |
| 4,471,659 | 9/1984 | Udd et al. | 73/655 |
| 4,634,852 | 1/1987 | Shaw | 356/345 X |
| 4,787,741 | 11/1988 | Udd et al. | 356/345 X |
| 4,789,241 | 12/1988 | Michal et al. | 356/350 |

OTHER PUBLICATIONS

Alder, Robert, "Interaction Between Light and Sound", IEEE Spectrum, May 1967, pp. 43–54.
E. Udd, et al., "Fiber-Optic Sensor Systems for Aerospace Applications", McDonnell Douglas Astronautics Company, Paper No. 838 19.

Primary Examiner—Davis L. Willis
Assistant Examiner—Matthew W. Koren
Attorney, Agent, or Firm—Curt L. Harrington; George W. Finch; John P. Scholl

[57] ABSTRACT

A system based on the usage of a Sagnac interferometer operating in a dual sensing mode is described which allows the determination of the location and amplitude of a time varying disturbance on a single fiber.

52 Claims, 5 Drawing Sheets

SAGNAC DISTRIBUTED SENSOR

BACKGROUND OF THE INVENTION

This invention relates generally to fiber optic detection systems based on the Sagnac interferometer. In one mode of operation the Sagnac interferometer disclosed by this invention responds to time varying environmental disturbances in a manner similar to that described by Richard Cahill and Eric Udd in U.S. Pat. No. 4,375,680, "Optical Acoustic Sensor" and by Eric Udd in "Fiber-Optic Acoustic Sensor Based on the Sagnac Interferometer", Proceedings of SPIE, Vol. 425, p. 90, 1983. There it was shown that the amplitude of the response to a time varying disturbance depends upon its position in the Sagnac loop where the sensing occurs. If the disturbance occurs near the center of the loop, the response becomes vanishingly small, while for a disturbance near the ends of the loop, the response approaches the maximum possible amplitude. In the second mode of operation, the Sagnac interferometer is configured to have sensitivity that is constant over the length of the sensing loop. These configurations are described in U.S. patent application Ser. No. 917,390, which issued on Nov. 29, 1988 as U.S. Pat. No. 4,787,741, applied for by Eric Udd, et al, and assigned to the assignee of the instant application.

John Dakin, in a paper entitled "A Novel Distributed Optical Fiber Sensing System Enabling Location of a Disturbance in a Sagnac Loop Interferometer", *Proceedings of the SPIE*, v. 838, p. 325 (1987), describes a combination of Mach-Zehnder and Sagnac interferometers where along a single fiber optic path the Mach-Zender interferometer has direct detection sensitivity while the Sagnac interferometer has position dependent sensitivity as noted above. By ratioing the position dependent and position independent signals, the location and magnitude of the disturbance may be determined. This latter invention is severely limited by the contradictory requirements of the Mach-Zehnder and Sagnac interferometers. For the Mach-Zehnder interferometer optimum performance is achieved by utilizing a long coherence length light source with high frequency stability. The performance of these light sources degrade rapidly with light feedback into the source. The Sagnac interferometer has optimum performance when a low coherence length light source is used, and its performance degrades rapidly as the coherence length increases due to Rayleigh backscatter from the sensing loop. The contradictory requirements of these interferometers result in a light source which is a compromise resulting in substantial limitations in the performance of one or both interferometers in the Dakin device severely limiting performance. The situation is further aggravated by the combination of Sagnac and Mach-Zehnder interferometer as described by Dakin resulting in direct feedback of the signal light into the light source, which results in a worst case scenario for the light source that would optimize the performance of the Mach-Zehnder.

What is desired is a fiber optic sensor that is capable of sensing both the location and magnitude of a disturbance along a single fiber without the limitations and excess noise generated by mixing the highly incompatible Sagnac and Mach-Zehnder interferometers.

SUMMARY OF THE INVENTION

The device and method of the present invention allows the magnitude and location of a time varying disturbance to be determined along a single fiber by using Sagnac interferometer based configurations that operate in modes that allow position independent sensitivity along the entire fiber sensing loop in one mode and position dependent sensing in the second mode. These outputs are then processed to determine position and magnitude of the disturbance. In one simplified embodiment, the magnitude and location of the disturbance is determined sequentially by switching between the two modes of operation. In other more complex and efficient embodiments, both the magnitude and location of the disturbance are simultaneously determined.

Omitting, for the purposes of this summary an explanation of the more technical performance elements of the system, the invention consists of a light source which injects light into a fiber and beam conditioning elements before being split into counterpropagating light beams around a loop of optical fiber by a light beamsplitter. Within the sensing loop there is an optical frequency shifting element. This may be operated in an "off" condition where both counterpropagating beams pass through it without being frequency shifted. In this mode of operation when a time varying disturbance impinges on the fiber loop, the relative phase shift generated between the counterpropagating light beams will depend on the location of the disturbance.

For example, if the disturbance is located near the center of the sensing loop, both counterpropagating light beams will arrive at essentially the same time and experience essentially the same disturbance. The net result is that the relative phase shift between the counterpropagating light beams will be small and when the two beams recombine at the beamsplitter the intensity change due to interference between the two beams will be small. When the disturbance occurs at a position that is substantially offset from the center of the fiber loop, the two beams arrive at significantly different times and the disturbance has time to effect a larger change. This results in a larger relative phase shift between the counterpropagating light beams and a larger amplitude intensity based signal when the two beams are interferometrically recombined on the beamsplitter.

In the second mode of operation, the frequency shifter is turned "on" and both counterpropagating light beams are frequency shifted when they pass through it. In this mode of operation the signal generated by an environmental disturbance along the sensing loop between the beamsplitter and the frequency shifter is independent of the position of the frequency shifter. Only after they pass through the frequency shifter do they differ in frequency by the amount of the frequency shift F in the loop. This is so, even though there are actually two sensing regions between the beamsplitter and the frequency shifter in the clockwise direction and between the beamsplitter and frequency shifter in the counterclockwise direction.

The functional difference between the counterdirectional orientation is that the Phase of the disturbance changes by 180 degrees between the regions. When an environmental effect occurs it changes the effective optical pathlength of a region of the loop. Since one of the counterpropagating light beams is cycling faster than the other if the overall pathlength of both light beams increases the faster oscillating light beam will increase in phase relative to the more slowly oscillating counterpropagating light beam. This phenomenon, which is position independent, provides a measure of the magnitude of the environmental effect. By comparing the output of the system with the frequency shifter switched in the "off" and "on" position dependent and position independent modes, the location as well as the magnitude of the disturbance may be deduced.

It is also possible to avoid the inconvenience of switching between operating modes by devising multiple Sagnac loop systems where a central loop is common to all the Sagnac light loops and performs multisensing capability. Because a very short coherence length light source may be used in this system, crosstalk between the Sagnac sensing loops is eliminated. One of the loops operates continuously in the mode where both counterpropagating beams are at the same frequency to determine position while the second loop operates with the light beams at differing frequency to measure the magnitude of the disturbance. Both of these loops have a common region consisting of a single fiber that is used to measure the magnitude and location of an environmental disturbance.

For certain applications it is desirable to measure more than one type of environmental effect, such as strain, temperature and acoustics along the same fiber. This can be done by using multiple light sources that vary in their output frequency to form in effect multiple equations in multiple unknowns that may be solved simultaneously to extract the various environmental disturbances. Further separation can be accomplished by using electronic filtering to separate low and high frequency environmental signals. These embodiments may be implemented by using multiple sets of loops operating at different wavelengths. Because the multiple Sagnac interferometric techniques described here support the usage of very low coherence length light sources many such loops may be supported.

BRIEF DESCRIPTION OF THE DRAWINGS

The above-mentioned and other features and objects of this invention will become more apparent by reference to the following description taken in conjunction with the accompanying drawings, in which.

DESCRIPTION OF THE PREFERRED EMBODIMENTS

Figure 1:
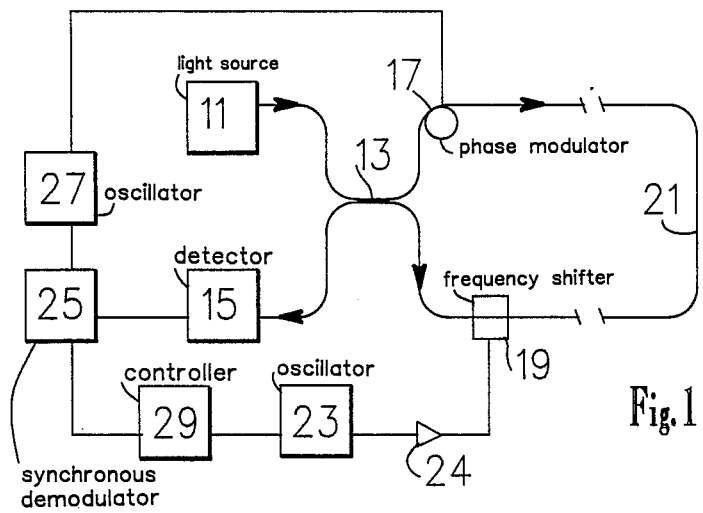
FIG. 1 is a simplified schematic of the distributed Sagnac sensor of the present invention.

Referring to FIG. 1, there is shown the basic Sagnac distributed sensor of the present invention. The Sagnac distributed sensor of the present invention has a light source 11 which may be a light emitting diode (LED) or pigtailed superradiant diode. Light source 11 is optically aligned with a beamsplitter 13. One output of the beamsplitter 13 is connected to an output photo detector 15.

Another output of beamsplitter 13 is connected to a phase modulator 17. Another output of beamsplitter 13 is connected to a frequency shifter switch 19. Both phase modulator 17 and frequency shifter switch 19 are connected to a sensing optical fiber 21. Optical fiber 21 provides the optical path means for conduction of light from light source 11. Frequency shifter switch 19 may be of the acousto optical type. A pair of breaks in the sensing optical fiber 21 are shown to emphasize the relatively longer length of optical fiber 21 with respect to the other optical connections shown in FIG. 1.

An oscillator 23 is connected to frequency shifter switch 19 via an amplifier 24. Output photodetector 15 is electrically connected to a synchronous demodulator 25. Synchronous demodulator 25 is electrically connected to an oscillator 27. Oscillator 27 is also connected to phase modulator 17. A controller 29 is connected to both synchronous demodulator 25 and oscillator 23.

For optimum workability, a fiber optic sensor will contain several other conditioning devices which are omitted from FIG. 1 in order to clearly illustrate the working principles contained therein. These types of devices are clearly taught in the literature on fiber optic rotation sensors. Light from light source 11 propagates through beamsplitter 13. The light then counter propagates about the optical fiber 21. One beam of light propagates in the clockwise direction passing first through phase modulator 17, and then through frequency shifter switch 19 before returning to beamsplitter 13. Another beam of light propagates in the counterclockwise direction passing first through frequency shifter switch 19, and then through phase modulator 17 before returning to beam splitter 13. This arrangement insures that the two counter propagating light beams arrive at detector 15 at the same frequency.

Frequency shifter switch 19 is activated to shift the frequencies of the counterpropagating beams of light. Demonstrations using a frequency of 80 MHz has been found to work satisfactorily in an acoustooptical frequency shifter. By virtue of its position at the end of one side of the loop, frequency shifter switch 19 shifts the frequency of one of the counter propagating beams of light before it enters optical fiber 21 and shifts the frequency of the other counterpropagating beam only after it has already passed through optical fiber 21. Frequency shifter 19 can be a serrodyne frequency shifter operated by a phase modulation device operating in ramp or serrodyne mode with, for example a saw toothed actuator. Frequency shifter 19 can also be implemented with a fiber having a piezoelectric covering, or with a fiber wound about a piezoelectric core. The environmental effect or disturbance causes an optical pathlength change due to contributions from (1) change in refractive index, (2) thermal elongation of the optical fiber 21, and (3) waveguide shifts due to strain. These effects are complex, and under a given set of circumstances can interact in different ways.

An environmental effect occurring along sensing optical fiber 21 will be experienced by both of the counterpropagating beams. The clockwise propagating beam leaves the beam splitter 13 and passes through phase modulator 17 and frequency shifter switch 19 where its frequency is shifted. The counterclockwise propagating beam passes by frequency shifter switch 19 where its frequency is also shifted and then through the midpoint of elongate optical fiber 21 and then through phase modulator 17. The counterpropagating light beams then recombine at beamsplitter 13 at the same frequency so that their phases can be compared. Since the two light beams propagated through optical fiber 21 at a different frequency, if the loop is disturbed causing an optical pathlength change in the sensing fiber 21, the two beams will experience a relative phase shift. This effect is termed a "nonreciprocal" phase shift.

As an example, temperature increases will cause optical fiber 21 to experience an optical pathlength change. This will cause the phases of the counterpropagating light beams to shift with respect to each other. The magnitude of the temperature change will determine the extent of the phase shift. The same is true for other environmental disturbances such as strain and tension.

In a second mode of operation, the frequency shifter switch 19 is deactivated, resulting in both counterpropagating light beams being at the same frequency. Under this condition, the environmentally induced phase differences are transmitted through to the detector 15. This mode of operation allows detection of a momentary phase shift dependent upon the location of the environmental disturbance along optical fiber 21. As an example, suppose that an optical disturbance occurs along the top half of the optical fiber 21 shown in FIG. 1.

For ease of illustration, the clockwise propagating light beam will be referred to as the first beam, and the counterclockwise beam will be referred to as the second beam. The first beam experiences the environmental disturbance upon the upper half of optic fiber 21 before it reaches the midpoint of the optic fiber and experiences a phase shift in relation to the severity of the environmental disturbance. The second beam will have experienced the effect after having passed through the lower half of the optical fiber 21, after traversing the midpoint, and just before returning to the detector. Because the disturbance is changing with time and the first and second beams arrive at different times, they will see different optical pathlengths and their relative phase will change. When the two beams recombine interferometrically on the beamsplitter, their phase difference results in an intensity modulated light signal that falls onto the detector 15. The signal from detector 15 is detected within synchronous demodulator 25. Synchronous demodulator 25, as well as phase modulator 17, is driven by oscillator 27. The demodulated signal, a synchronous demodulator 25, is converted to a current or voltage output. This output goes to a controller 29 which switches the oscillator 23 driving the frequency shifter switch 19 on and off between the two operating modes. The outputs from the controller 29 indicative of the location and amplitude of the environmental signal correspond to the outputs from the synchronous demodulator 25 during each mode of operation. Frequency shifter 19 is driven by a signal from oscillator 23 which is amplified in amplifier 24.

The phase shift just described for an environmental disturbance occurs over a very small time frame. The extent of the phase shift of the second beam depends upon the severity and time dependence of the environmental disturbance, and the extent of the phase shift of the first beam in catching up with the phase shift of the second beam is also dependent upon the severity and time dependence of the environmental disturbance, and to the same extent as that occurring in the second beam. The difference between the time of arrival of the second beam and the time of arrival of the first beam, however, is determined by the location of the environmental disturbance along the optic fiber 21 of the disturbance.

In the case of an environmental effect occurring on the upper portion of the loop very near the end, it is clear that the clockwise beam would experience the effect very early during its travel through optical fiber 21, while the counterclockwise beam would experience the disturbance very late in its travel through optical fiber 21. This would represent the case for the maximum time difference between the arrival of the first and second beams at the environmental disturbance location. This will result in the maximum signal provided the induced phase shift between the beams is less than one wave over the time interval between the first and second beams arrival. This latter condition is usually the case for many applications.

However, if the environmental disturbance occurred close to the midpoint along the upper portion of optical fiber 21, the clockwise beam would experience the disturbance very late during its travel through optical fiber 21, while the counterclockwise beam would experience the disturbance just after passing the midpoint and very early in its travel through the top portion of optical fiber 21. This would represent the case for minimum duration between the beginning of the phase shift of the second beam at the detector and the beginning of the phase shift of the first beam; i.e., the time of arrival difference will approach zero.

In this case the phase shift of the second beam would be immediately followed by a phase shift in the first beam. The phase of the first beam begins "catching up" with the second before the phase of the second beam has time to shift very far away from the phase of first beam. Thus the relative phase shift between the first and second beams is of relatively short duration.

Thus, in the second mode of operation, the relative phase difference between the first and second beam is dependent both upon the degree of optical pathlength change, which translates into a relative phase shift, and is also dependent upon the time of arrival interval between the first beam and the second beam which depends on the position of the disturbance in the loop.

The relative phase shift has contributions due to the severity and location of the environmental disturbance. Thus the relative phase shifts carry composite information about the severity and location of an environmental disturbance. The composite information, without more, would be ineffective in helping identify separately the severity and location of the environmental disturbance. However, since we can operate in frequency shift mode as mentioned above, we can ascertain the magnitude of the environmental disturbance upon the whole of the optical fiber 21. Also known is the relationship between the magnitude of the environmental disturbance along the length of optical fiber 21 and the relative phase shift produced due to such disturbance. Indeed, the magnitude of the disturbance is measured according to the phase shift so produced. Once the phase shift due to the magnitude of the environmental disturbance along the length of optical fiber 21 is ascertained, it can be used to measure the location in combination with the signal derived from the two beams counterpropagating at the same frequency.

The device of FIG. 1 is capable of operating in frequency shift mode to determine the magnitude of the disturbance along optical fiber 21 or is capable of operation with the frequency shifter switch 19 de-energized to obtain the composite disturbance severity/location information. The device of FIG. 1, however, must be switched between these two operating modes. Another mode of operation would include operation with the frequency shifter in the de-energized state. Once a disturbance occurs, the relative phase shift information is obtained. The device can then be switched to the frequency shift mode to determine the magnitude of the disturbance. Once this composite information is determined, the location information is readily calculated by ratioing the phase shift due to the magnitude of the disturbance to the position dependent phase shift.

Figure 2:
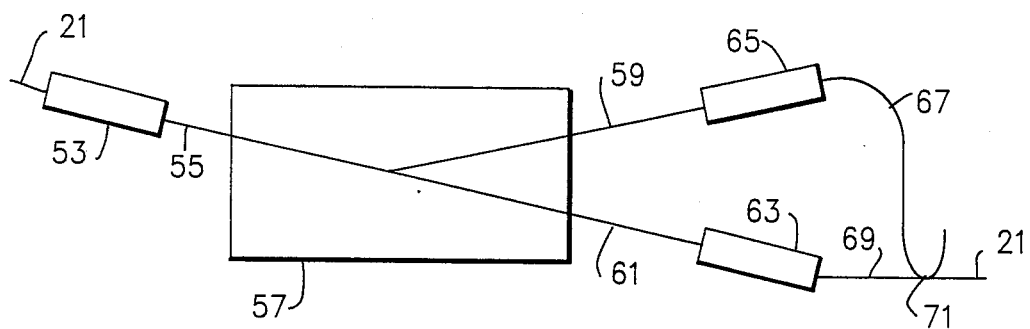
FIG. 2 is a schematic of the frequency shifting switch of the distributed Sagnac sensor as shown in FIG. 1.
Figure 3:
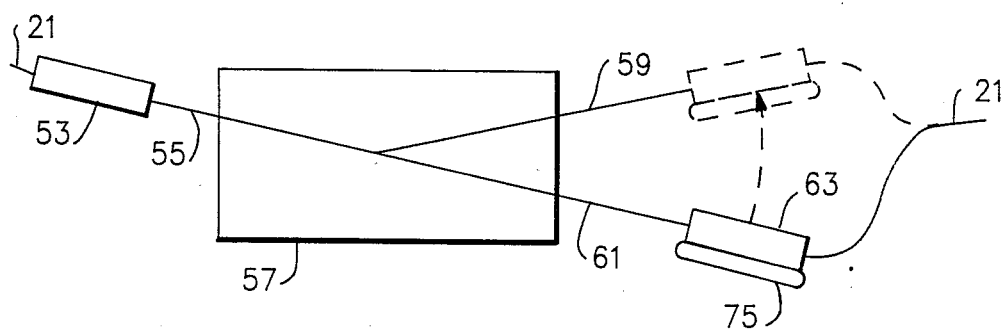
FIG. 3 is a schematic of a mechanical frequency shifting switch utilizable with the distributed Sagnac sensor as shown in FIG. 1.

There are a number of ways to implement frequency shifting switch 19. FIGS. 2 and 3 illustrate two methods based upon the use of acoustooptic modulators. FIG. 2 illustrates frequency shifter switch 19 connected between the ends of optical fiber 21. Beginning at the left, optical fiber 21 is in optically connected to a lens 53. Lens 53 is in optical alignment with an acoustooptic modulator 57. Acoustooptic modulator 57 can be made from a crystal of $TeO_2$ and have a $LiNbO_3$ transducer to acoustically activate the crystal. Acoustooptic modulator 57 forms a direct optical alignment with a lens 63. In addition acoustooptic modulator 57 forms an angled optical alignment with a lens 65. Lens 63 is connected to a short length of optical fiber 69. Lens 65 is connected to a short length of optical fiber 67. Both short lengths of optical fiber 67 and 69 are connected to a fiber beamsplitter 71. Fiber beam splitter is connected to optical fiber 21, also shown on FIG. 1.

Referring to FIG. 2, the first method of operation entails a light beam propagating through optical fiber 21 and then collimated by graded index lens 53. The resulting light beam 55 then enters the acoustooptic modulator 57 at approximately the Bragg angle for near optimum frequency shifting conditions. When the power to the acoustooptic modulator 57 is switched off by the controller 29 of FIG. 1, the light passes through the modulator 57 without being frequency shifted. The non-frequency shifted light is then collected by a lens 63 and coupled into a short length of optical fiber 69. The light beam then passes through a fiber beamsplitter 71 before again being coupled into the optical fiber 21 of the Sagnac distributed sensor of FIG. 1.

When the power to acoustooptic modulator 57 is switched to the on condition, the majority of the light beam is frequency shifted and angularly directed away from the non frequency shifted light beam. This light beam 59 is collected by the lens 65 and coupled into the optical fiber 67 before passing through the fiber beam splitter 71 before being again coupled into the optical fiber 21 of the Sagnac distributed sensor of FIG. 1.

Referring to FIG. 3, the frequency shifting switch 19 is as shown in FIG. 2 up to and including the acoustooptic modulator 57. In FIG. 3, however, there is only one lens 63, and it is mounted upon a mechanical actuator 75. Lens 63 is optically coupled directly into optical fiber 21 of FIG. 1. In the second method of operation, light again enters the optical fiber 21 and again is collimated by graded index lens 53. The resulting light beam 55 then enters the acoustooptic modulator 57, as before, at approximately the Bragg angle for near optimum frequency shifting conditions. The output light beams, 59 and 61, however, are collected by a single lens 63 moved by a mechanical actuator 75. Mechanical actuator 75 is moved to the position which allows optimum coupling of the light beams 59 and 61 into the optical fiber 21. When the power to the acoustooptic modulator 57 is switched off by the controller 29 of FIG. 1, the light passes through the modulator 57 without being frequency shifted. The unfrequency shifted light is then collected by the lens 63 when the mechanical actuator 75 moves lens 63 into optical alignment with light beam 61. When the power to the acoustooptic modulator 57 is switched on by the controller 29 of FIG. 1, the light passes through the modulator 57 and is frequency shifted. The frequency shifted light beam 59 leaves modulator 57 and is collected by lens 63 after lens 63 is moved into position by mechanical actuator 75. The light beam then passes through into optical fiber 21 of the Sagnac distributed sensor of FIG. 1.

Figure 4:
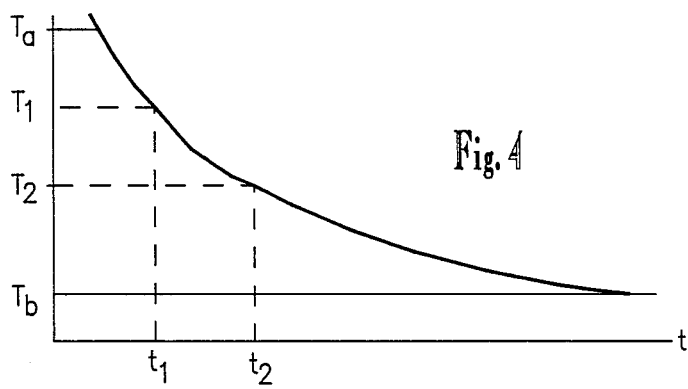
FIG. 4 is a graphical illustration of a temperature type changing environmental effect plotted against the travel time of the two counterpropagating light beams in the device of FIG. 1.

Referring to FIG. 4 in conjunction with FIG. 1, a graph illustrating the workings of the theory is shown. The ordinate of the graph represents the temperature at any point along the optical fiber 21. The abscissa represents the time delay caused by the differing time of arrival for each of the counterpropagating beams. Assuming a sudden drop in temperature along optical fiber 21, the section of fiber experiencing the temperature drop was originally at temperature $T_a$ and is proceeding to temperature $T_b$. The curve represents the temperature change of the optical fiber 21 as a function of time.

To better visualize the theory of the invention, consider a "pulse" of light emitted from light source 11 at time equal to zero, $T_0$. Assume that the disturbance is on the upper part of the optical fiber 21. The temperature of the fiber is made to begin dropping as soon as the "pulse" of light leaves the light source 11. The light passes through beam splitter 13 and is split into counterpropagating light beams. As the light beams propagate about optical fiber 21, the temperature at the point in question along optical fiber 21 continues to drop. As the clockwise quantity of light passes the section of optical fiber 21 experiencing the temperature drop, it is at temperature $T_1$. The clockwise quantity of light experiences a phase delay dependent upon the refractive index of the temperature affected portion of optical fiber 21, to the extent of its temperature at the time the clockwise quantity of light passes it. After the clockwise pulse of light experiences the phase delay, it continues in a clockwise direction.

Meanwhile, the counterclockwise beam of light is approximately opposite the clockwise beam of light, but on the underside of the loop. As the counterclockwise beam continues around the loop, the clockwise beam already having experienced the temperature $T_1$, the temperature of the disturbance region of optical fiber 21 continues to drop. By the time the counterclockwise beam of light reaches the disturbance region, the temperature of the region has dropped to $T_2$. Since $T_2$ is lower than $T_1$, the optical fiber contracts, and the optical pathlength is shorter, and the phase of the counterclockwise pulse is delayed relative to the clockwise light beam. A more severe phase shift translates into a greater delay time. After being phase shifted, the counterclockwise beam of light continues on to beamsplitter 13 and then to detector 15, the relative phase change results.

Figure 5:
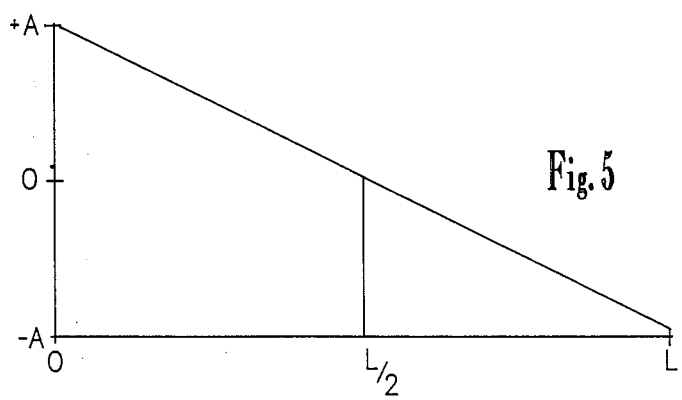
FIG. 5 is a graph illustrating the position dependent response due to a time changing environmental effect which induced a fraction of a full wave of relative pathlength difference between the counterpropagating light beams.

As previously discussed, the information pertaining to the magnitude of the disturbance, determined using the frequency shift mode, as described above, can be used to determine the position along optical fiber 21 at which the environmental effect occurred. The data relating information pertaining to the severity of the environmental disturbance along the loop to the composite information obtained due to the momentary phase shift is readily integratable into a normalization chart. FIG. 5 shows the curve for such a normalization. The normalized values of the ordinate of FIG. 5 range from +1 to −1. A positive value represents a positive phase shift, corresponding to the clockwise counterpropagating light beam being shifted in the positive direction with respect to the other beam. A negative value represents a negative phase shift, corresponding the clockwise counterpropagating light beam being shifted in the negative direction with respect to the other beam. The abscissa of the graph of FIG. 5. represents the distance around the circumference of the optical fiber 21.

The center of the graph corresponds to a disturbance occurring in the center of the optical fiber 21. Even though a disturbance occurring at the center of the optical fiber 21 produces no relative phase shift, the magnitude of the disturbance information with which the curve of FIG. 5 is normalized will nevertheless reveal the location of the disturbance along optical fiber 21. The attenuation information illustrated in the graph of FIG. 5 can easily be converted to tabular form for use with a digital computer.

Figure 6:
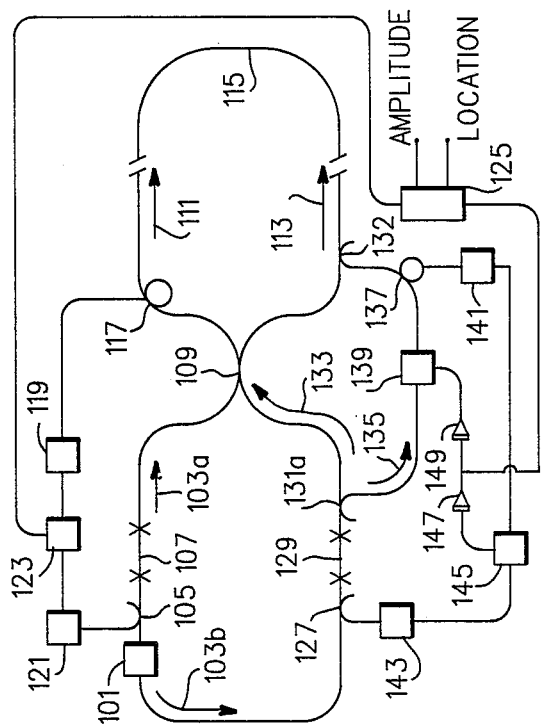
FIG. 6 is a detailed schematic of a dual mode Sagnac distributed sensor using both facets of a light source.

Referring to FIG. 6, a detailed schematic of a Sagnac distributed sensor which simultaneously determines the magnitude and location of an environmental disturbance is shown. The necessity to switch to and from the frequency shift mode is eliminated. A common optical fiber path is used for simultaneous measurement of the position and severity of an environmental disturbance. Light from a light source 101, which may be a light emitting or superradiant diode, is coupled out of both ends 103a and 103b of light source 101. Light coupled into end 103a propagates past a fiber coupler 105 and a polarizing element 107 before being split into two counterpropagating light beams by a beamsplitter 109. Light polarization control may be handled by using polarization preserving optical fiber or polarization scrambling techniques described in the literature. A clockwise beam 111 and a counterclockwise beam 113 are circulated through an optical fiber 115. The clockwise beam 111 first passes through an optical phase modulator 117 which is driven at a frequency w by an electrical oscillator 119. The resulting phase modulation between the counterpropagating light beams 111 and 113 is used for detection of a disturbance as described above.

The two counterpropagating light beams 111 and 113 complete their paths about optical fiber 115, recombine on the beamsplitter 109, and are directed through the polarizer 107 and fiber coupler 105 to an output detector 121. Output detector 121 is electrically connected to a synchronous demodulator 123. Electrical oscillator 119 is also connected to synchronous demodulator 123. Synchronous demodulator 123 is also connected to a normalization circuit 125. Synchronous demodulator 123 is used to convert the output of output detector 121, produced due to the environmental effect acting upon optical fiber 115, into a voltage output. Output detector 121, and synchronous demodulator 123 measure the momentary relative phase shift of the counterpropagating beams 111 and 113. The location and severity of the environmental disturbance on the optical fiber 115 will determine the amplitude of this voltage output. The output from synchronous demodulator 123 is electrically sent to normalization circuit 125 for processing.

At end 103b of light source 101, light is directed to a coupler 127 and a polarizer 129 before being split by a beamsplitter 131a into a clockwise counterpropagating light beam 133 and a counterclockwise counterpropagating light beam 135. Beams 133 and 135 also propagate along the sensing portion of optical fiber 115. This is accomplished by clockwise propagation of beam 133 from beamsplitter 131a, through beamsplitter 109, phase modulator 117, the length of optical fiber 115, a fiber coupler 132, a phase modulator 137, and a frequency shifter 139. Counterclockwise propagation of beam 135 follows the same path, but in reverse order.

Phase modulator 137 is electrically connected to an oscillator 141. The phase modulator 137 is driven at a frequency $w_2$ by oscillator 141. The frequency $w_2$ is chosen to facilitate its demodulation from frequency w. Counterpropagating light beams 133 and 135 recombine on the beamsplitter 131a and are directed through polarizer 129 and coupler 127 to a detector 143. The relative phase of the two light beams 133 and 135 once they have returned will depend upon the bulk length of the optical fiber 115. However, because of the action of the frequency shifter 139 in offsetting the total path lengths of the counterpropagating light beams 133 and 135 through the optical fiber 115, the magnitude of the environmental effect along the whole optical fiber 115 is measured as proportional to the signal sent to frequency shifter 139 to keep the relative phase difference of the light beams 133 and 135 at zero. This process is known as phase nulling.

A synchronous demodulator 145, electrically connected to detector 143, is used demodulate the signal received at detector 143. Synchronous demodulator 145 is set to demodulate at frequency $w2$. Synchronous demodulator 145 outputs a voltage electrically supplied to an integrator 147 and a voltage controlled oscillator 149. Voltage controlled oscillator 149 is electrically connected to frequency shifter 139. Voltage controlled oscillator 149 supplies a signal which readjusts the frequency of frequency shifter 139 so that the relative phases of the light beams 133 and 135 are counterbalanced and the system is nulled out. The amplitude of the signal controlling frequency shifter 143 is independent of the position of the disturbance along the length of optical fiber 115. Detector 143, synchronous demodulator 145 and integrator 147 measure the steady state relative phase shift between beams 133 and 135.

The output voltage from integrator 147 is also supplied to normalization circuit 125. Normalization circuit 125, which also receives output from synchronous demodulator 123, can now produce two output signals, one proportional to the severity of the disturbance, and the other proportional to the location of the disturbance along optical fiber 115.

Figure 7:
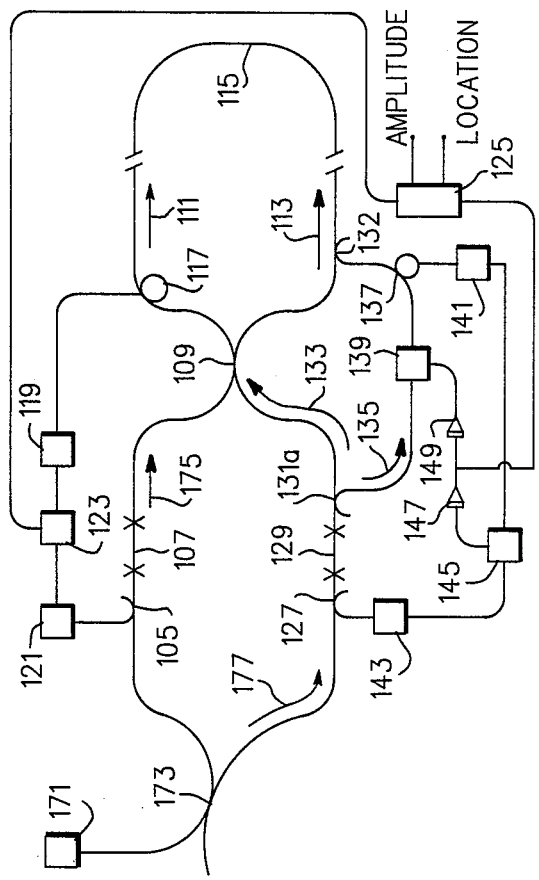
FIG. 7 is a detailed schematic of a dual mode Sagnac distributed sensor using a single facet of a light source; and, FIG. 8 is a detailed schematic of a dual mode Sagnac distributed sensor providing optical isolation between operational modes.

FIG. 7 illustrates another embodiment of the present invention. A single faceted light source 171 supplies light to a beamsplitter 173. The light is split into a light beam 175 and a light beam 177. The remainder of the system operation is identical to that previously discussed for FIG. 6. Light beam 175 acts in the same manner as light which propagates from end 103a of light source 101 of FIG. 6. Light beam 177 acts in the same manner as light which propagates from end 103b of light source 101 of FIG. 6.

Figure 8:
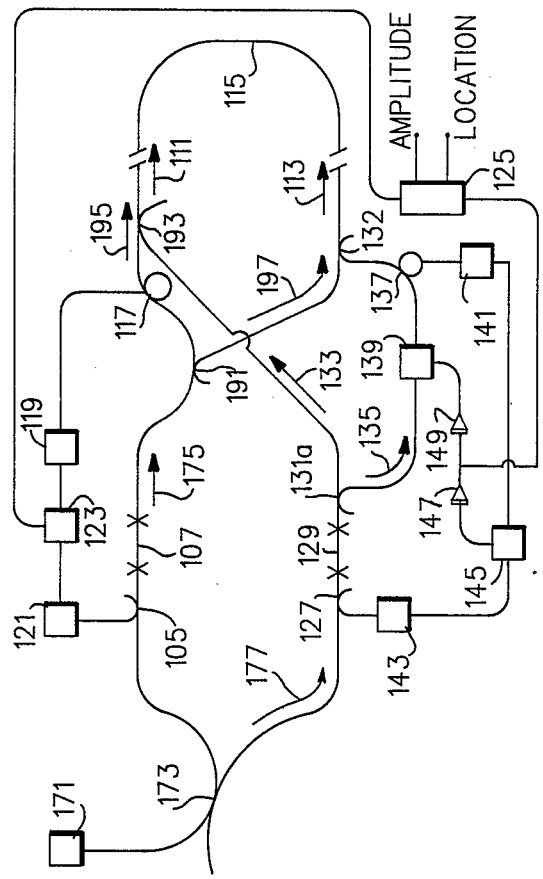

FIG. 8 illustrates another embodiment of the present invention. The single faceted light source 171, beamsplitter 173 and light beams 175 and 177 are present as was previously shown in FIG. 7. Here, a beams splitter 191 is provided to split light beam 175. A fiber coupler 193 is provided to couple light beam 133 into the optical fiber 115. Beamsplitter 191 splits light beam 175 into a clockwise light beam 195 and a counterclockwise light beam 197. Light beam 133 and light beam 195 combine at fiber coupler 193 to form the clockwise propagating light beam 111. Likewise, light beam 197 and light beam 135 are combined fiber coupler 132 to form counterclockwise propagating light beam 113. This configuration provides isolation between the two sensing circuits of the dual mode sagnac sensor. The counterpropagating light beams 195 and 197 which interfere and provide an output signal on output detector 121 will not interfere with the counterpropagating light beams 133 and 135 which interfere to produce an output signal on output detector 143. This is due to using a short coherence length light source 171 and ensuring that the optical pathlength offsets between the two loops are large compared to the light source coherence length.

The foregoing disclosure and description of the invention are illustrative and explanatory thereof, and various changes in the optical circuit elements, the medium through which the light propagates, and light beam conditioning devices, as well as the details of the illustrated configuration may be made without departing from the spirit and scope of the invention.

I claim:

1. A distributed optic sensor, comprising:
    light source means for producing a first beam of light;
    beam splitting means, optically connected to said light source means, for receiving said first beam of light from said light source means, splitting said beam of light into a second and a third beam of light, and recombining said second and said third beams into a fourth beam of light;
    optical path means in optical connection with said beam splitting means for directing said second and third beams in counterpropagating directions.
    phase modulating means, optically connected to said optical path means, for impressing a demodulation frequency change on one of said second and third beams of light as it enters said optical path means, and for impressing a demodulation frequency change on the other of said second and third beams of light as it leaves said optical path means;
    frequency shifting switch means, optically connected to said optical path means, for switching and controlling the frequency difference between said second and third counterpropagating light beams; and,
    detection means, optically connected to said optical path means, for detecting momentary and steady state phase shifts of said second and said third beams of light from said fourth light beam including electrical circuitry means for measuring the environmental disturbances along said optical path means.

2. The fiber optic sensor of claim 1 further comprising controller means connected to said phase modulating means and said frequency shifting means for selectively activating said phase modulating means and said frequency shifting means.

3. The fiber optic sensor of claim 1 wherein said light source means further comprises a superradiant diode.

4. The fiber optic sensor of claim 1 wherein said light source means further comprises a light emitting diode.

5. The fiber optic sensor of claim 1 wherein said optical path means further comprises an optical fiber.

6. The fiber optic sensor of claim 1 wherein said frequency shifting switch means further comprises an acoustooptic modulator.

7. The fiber optic sensor of claim 1 wherein said frequency shifting switch means further comprises an integrated optic phase modulator operating as a serrodyne frequency shifter.

8. The fiber optic sensor of claim 1 wherein said phase modulating means further comprises an acoustooptic modulator.

9. The fiber optic sensor of claim 1 wherein said frequency shifting means further comprises an optical fiber with a piezoelectric covering.

10. The fiber optic sensor of claim 1 wherein said beam splitting means further comprises a fiber optic beamsplitter.

11. A fiber optic sensor, comprising:
    light emitting means for producing light;
    phase shift detection means, optically connected to said light emitting means, for detecting relatively short duration phase shifts in optical beams;
    first beam splitting means, optically connected to said phase shift detection means, for receiving light from said light emitting means, splitting said beam of light into a first and a second beam of light, and for recombining said first and said second beams into a third beam of light;
    first optical path means optically connected to said first beam splitting means for directing said first and said second beams in counterpropagating directions;
    first phase modulating means, optically connected to said first optical path means for impressing a first demodulation frequency on one of said first and said second beams of light as it enters said first optical path means, and for impressing a demodulation frequency change on the other of said first and said second beams of light as it leaves said first optical path means;
    first optical coupling means, optically connected to said first optical path means for coupling light from a direction of propagation thereof to at least one other direction of propagation;
    steady state phase shift detection means, optically connected to said light emitting means, for detecting longer duration phase shifts in optical beams;
    second beam splitting means, optically connected to said steady state phase shift detection means and said first beam splitting means, for receiving light from said light emitting means, splitting said beam of light into a fourth and a fifth beam of light, and for recombining said fourth and said fifth beams into a sixth beam of light;
    second optical path means, optically connected to said second beam splitting means for directing said fourth and said fifth beams in counterpropagating directions;
    frequency shifting means, optically connected to said second optical path means for affecting the optical length of said second optical path means;
    second phase modulation means, optically connected to said second optical path means, between said frequency shifting means and said first optical coupling means for impressing a second demodulation frequency on one of said fourth and said fifth beams of light as it enters said second optical path means, and for impressing a second demodulation frequency on the other of said fourth and said fifth beams of light as it leaves said second optical path means; a portion of said second optical path means occupying a portion of the physical space occupied by said first optical path means from said first optical coupling means, through said first phase modulating means, to said first beam splitting means to form a common area; and, normalization means, having an input connected to said steady state phase shift detection means and to said phase shift detection means, for generating an output signal indicative of the location of a disturbance in said common area of said first and said second optical path means, and for generating an output signal indicative of the severity of a disturbance in said common area of said first and said second optical path means.

12. The fiber optic sensor of claim 11 wherein said first and said second beam splitting means further comprises a fiber optic beamsplitter.

13. The fiber optic sensor of claim 11 wherein said light source means further comprises a light emitting diode.

14. The fiber optic sensor of claim 11 wherein said light source means further comprises a superradiant diode.

15. The fiber optic sensor of claim 11 wherein said first and said second optical path means further comprises at least one optical fiber.

16. The fiber optic sensor of claim 11 wherein said frequency shifting means further comprises an integrated optic modulator.

17. The fiber optic sensor of claim 11 wherein said first and said second phase modulating means further comprises an acoustooptical modulator.

18. The fiber optic sensor of claim 11 wherein said frequency shifting means further comprises an optical fiber with a piezoelectric covering.

19. The optic sensor of claim 11 wherein said light emitting means is capable of emitting light in at least two directions.

20. The fiber optic sensor of claim 11 wherein said optical coupling means further comprises a fiber optic coupler.

21. The optic sensor of claim 11 further comprising:
a first polarizing means, in optical connection between said momentary relative phase shift detection means and said first beam splitting means, for polarizing said light produced from said light emitting means; and,
a second polarizing means, in optical connection between said steady state relative phase shift detection means and said second beam splitting means, for polarizing said light produced from said light emitting means.

22. The optic sensor of claim 11 wherein said phase shift detection means further comprises:
second optical coupling means, optically connected with said light emitting means and with said first beam splitting means, for coupling said third beam of light propagating from said first beam splitting means;

first detector means, optically connected to said second optical coupling means, for detecting said third beam of light from said first beam splitting means and producing a first signal indicative of the characteristics of said third beam of light;
first demodulator means, connected to said first detector means, for demodulating said first frequency from said first signal; and,
first oscillator means, connected to said first demodulator means and to said first phase modulating means, for generating an output having a first frequency and transmitting said output to said first phase modulation means to be impressed on said first and said second beams of light.

23. The optic sensor of claim 11 wherein said steady state phase shift detection means further comprises:
second optical coupling means, optically connected to said light emitting means and said first beam splitting means, for coupling said sixth beam of light propagating from said second beam splitting means;
first detector means, optically connected to said second optical coupling means, for detecting said sixth beam of light from said second beam splitting means and producing a second signal indicative of the characteristics of said sixth beam of light;
first demodulator means, connected to said first detector means, for demodulating said second frequency from said second signal;
integration means, connected to said first demodulator means and to said frequency shifting means, for generating an output representative of the integral of the demodulated said second signal; and,
first oscillator means, connected to said first demodulator means and to said frequency shifting means, for providing said second frequency signal to said frequency shifting means to be impressed on said fourth and said fifth beams of light.

24. The optic sensor of claim 23 wherein said steady state phase shift detection means further comprises:
third optical coupling means, optically connected to said light emitting means and said first beam splitting means, for coupling said sixth beam of light propagating from said second beam splitting means;
second detector means, optically connected to said third optical coupling means, for detecting said sixth beam of light from said second beam splitting means and producing a second signal indicative of the characteristics of said sixth beam of light;
second demodulator means, connected to said second detector means, for demodulating said second frequency from said second signal;
integration means, connected to said second demodulator means and to said frequency shifting means, for generating an output representative of the integral of the demodulated said second signal, said integration means also having an intermediate output; and,
second oscillator means, connected to said second demodulator means and to said frequency shifting means, for providing said second frequency signal to said frequency shifting means to be impressed on said fourth and said fifth beams of light.

25. A fiber optic sensor, comprising:
light emitting means for producing light;
first optical coupling means, optically connected to said light emitting means, for coupling light from the path of said light emitting means to at least one other direction of propagation;

first beam splitting means, optically connected to said first optical coupling means, for receiving light from said light emitting means, splitting said beam of light into a first and a second beam of light, and for recombining said first and said second beams into a third beam of light;

first optical path means optically connected to said first beam splitting means for directing said first and said second beams in counterpropagating directions;

first phase modulating means, optically connected to said optical path means and said first beam splitter, for impressing a first frequency on one of said first and said second beams of light as it enters said first optical path means, and for impressing a frequency change on the other of said first and said second beams of light as it leaves said first optical path means;

second optical coupling means, optically connected to said first optical path means for coupling light into said first optical path means;

first detector means, optically connected to said first optical coupling means, for detecting said third beam of light from said first beam splitting means and producing a first signal indicative of the characteristics of said third beam of light;

first demodulator means, connected to said first detector means, for demodulating said first frequency from said first signal;

first oscillator means, connected to said first demodulator means and to said first phase modulating means, for generating an output having a first frequency and transmitting said output to said first phase modulation means to be impressed on said first and said second beams of light;

third optical coupling means, optically connected to said light emitting means, for coupling light from the path of said light emitting means to at least one other direction of propagation;

second beam splitting means, optically connected to said third optical coupling means and said first beam splitting means, for receiving light from said light emitting means, splitting said beam of light into a fourth and a fifth beam of light, and for recombining said fourth and said fifth beams into a sixth beam of light;

second optical path means, optically connected to said second beam splitting means for directing said fourth and said fifth beams in counterpropagating directions;

frequency shifting means, optically connected to said second optical path means and said second beam splitter, for affecting the optical length of said second optical path means;

second phase modulation means, optically connected to said second optical path means for impressing a second frequency on one of said fourth and said fifth beams of light as it enters said second optical path means, and for impressing a second frequency on the other of said fourth and said fifth beams of light as it leaves said second optical path means; a portion of said second optical path means occupying a portion of the physical space occupied by said first optical path means, from said second optical coupling means, through said first phase modulating means, to said first beam splitting means, to form a common area;

second detector means, optically connected to said third optical coupling means, for detecting said sixth beam of light from said second beam splitting means and producing a second signal indicative of the characteristics of said sixth beam of light;

second demodulator means, connected to said second detector means, for demodulating said second frequency from said second signal;

integration means, connected to said second demodulator means and said frequency shifting means, for generating an output representative of the integral of the demodulated said second signal, said integration means also having an intermediate output;

second oscillator means, connected to said output of said demodulator means, for providing a signal having a second frequency and transmitting said signal having a second frequency to said second phase modulation means to be impressed on said fourth and said fifth beams of light; and, Normalization means, having an input connected to said intermediate output of said integration means and to said first demodulation means, and an output, for generating an output signal indicative of the location of a disturbance in said common area of said first and said second optical path means, and for generating an output signal indicative of the severity of a disturbance in said common area of said first and said second optical path means.

26. The fiber optic sensor of claim 25 wherein said first and said second beam splitting means further comprises a fiber optic beamsplitter.

27. The fiber optic sensor of claim 25 wherein said light source means further comprises a light emitting diode.

28. The fiber optic sensor of claim 25 wherein said light source means further comprises a superradiant diode.

29. The fiber optic sensor of claim 25 wherein said first and said second optical path means further comprises at least one optical fiber.

30. The fiber optic sensor of claim 25 wherein said frequency shifting means further comprises:
a piezoelectric core; and
an optical fiber surrounding said piezoelectric core.

31. The fiber optic sensor of claim 25 wherein said frequency shifting means further comprises an optical fiber with a piezoelectric covering.

32. The optic sensor of claim 25 wherein said light emitting means is capable of emitting light in at least two directions.

33. The fiber optic sensor of claim 25 wherein said first and said second optical coupling means each further comprises a fiber optic coupler.

34. The optic sensor of claim 25 further comprising:
a first polarizing means, optically connected between said first optical coupling means and said first beam splitting means, for polarizing said light produced from said light emitting means; and,
a second polarizing means, optically connected between said third optical coupling means and said second beam splitting means, for polarizing said light produced from said light emitting means.

35. A fiber optic sensor, comprising
light emitting means for producing light;
first beam splitting means, optically connected to said light emitting means, for receiving light from said light emitting means, splitting said beam of light into a first and a second beam of light;

first optical coupling means, optically connected to said first beam splitting means, for coupling light from the path of said first beam of light to at least one other direction of propagation;

second beam splitting means, optically connected to said first optical coupling means, for receiving said first beam of light from said first beam splitting means, splitting said first beam of light into a third and a fourth beam of light, and for recombining said third and said fourth beams into a fifth beam of light;

first optical path means optically connected to said second beam splitting means for directing said third and said fourth beams in counterpropagating directions;

first phase modulating means, optically connected to said first optical path means for impressing a first frequency on one of said third and said fourth beams of light as it enters said first optical path means, and for impressing a first frequency on the other of said third and said fourth beams of light as it leaves said first optical path means;

second optical coupling means, optically connected to said first optical path means for coupling light into said first optical path means, from at least one other direction thereof;

first detector means, optically connected to said first optical coupling means, for detecting said fifth beam of light from said second beam splitting means and producing a first signal indicative of the characteristics of said fifth beam of light;

first demodulator means, connected to said first detector means, for demodulating said first frequency from said first signal;

first oscillator means, connected to said first demodulator means and to said first phase modulating means, for generating an output having a first frequency and transmitting said output to said first phase modulation means to be impressed on said third and said fourth beams of light;

third optical coupling means, optically connected to said first beamsplitting means, for coupling light from the path of said second beam of light to at least one other direction of propagation;

third beam splitting means, optically connected to said third optical coupling means and said second beam splitting means, for receiving said second beam of light from said first beam splitting means, splitting said second beam of light into a sixth and a seventh beam of light, and for recombining said sixth and said seventh beams into an eighth beam of light;

second optical path means, optically connected to said third beam splitting means for directing said sixth and said seventh beams in counterpropagating directions;

frequency shifting means, optically connected to said second optical path means for affecting the optical length of said second optical path means;

second phase modulation means, optically connected to said second optical path means for impressing a second frequency on one of said sixth and said seventh beams of light as it enters said second optical path means, and for impressing a second frequency on the other of said sixth and said seventh beams of light as it leaves said second optical path means; a portion of said second optical path means occupying a portion of the physical space occupied by said first optical path means, from said second optical coupling means, through said first phase modulating means, to said second beam splitting means to form a common area;

second detector means, optically connected to said third optical coupling means, for detecting said eighth beam of light from said third beam splitting means and producing a second signal indicative of the characteristics of said eighth beam of light;

second demodulator means, connected to said second detector means, for demodulating said second frequency from said second signal;

integration means, connected to said second demodulator means and said frequency shifting means, for generating an output representative of the integral of the demodulated said second signal, said integration means also having an intermediate output;

second oscillator means, connected to said output of said integration means, for providing a strength signal to said frequency shifting means for generating an output having a second frequency and transmitting said output to said second phase modulation means to be impressed on said sixth and said seventh beams of light; and, normalization means, having an input connected to said intermediate output of said integration means and to said first demodulation means, and an output, for generating an output signal indicative of the location of a disturbance in said common area of said first and said second optical path means, and for generating an output signal indicative of the severity of a disturbance in said common area of said first and said second optical path means.

36. The optic sensor of claim 35 further comprising:
a first polarizing means, optically connected between said first optical coupling means and said second beam splitting means, for polarizing said first beam of light from said first beam splitting means; and,
a second polarizing means, optically connected between said third optical coupling means and said third beam splitting means, for polarizing said second beam of light from said first beam splitting means.

37. The fiber optic sensor of claim 35 wherein said first and said second beam splitting means further comprises a fiber optic beamsplitter.

38. The fiber optic sensor of claim 35 wherein said light source means further comprises a light emitting diode.

39. The fiber optic sensor of claim 35 wherein said light source means further comprises a superradiant diode.

40. The fiber optic sensor of claim 35 wherein said first and said second optical path means further comprises at least one optical fiber.

41. The fiber optic sensor of claim 35 wherein said frequency shifting means further comprises an integrated optical modulator.

42. The fiber optic sensor of claim 35 wherein each of said first, said second, and said third optical coupling means further comprises a fiber optic coupler.

43. A fiber optic sensor, comprising:
light emitting means for producing light;
first beam splitting means, optically connected to said light emitting means, for receiving light from said light emitting means, splitting said beam of light into a first and a second beam of light;

first optical coupling means, optically connected to said first beam splitting means, for coupling light from the path of said first beam of light to at least one other direction of propagation;

second beam splitting means, optically connected to said first optical coupling means, for receiving said first beam of light from said first beam splitting means, splitting said first beam of light into a third and a fourth beam of light, and for recombining said third and said fourth beams into a fifth beam of light;

first optical path means optically connected to said second beam splitting means for directing said third and said fourth beams in counterpropagating directions;

first phase modulation means, optically connected to said first optical path means for impressing a first frequency on one of said third and said fourth beams of light as it enters said first optical path means, and for impressing a first frequency on the other of said third and said fourth beams of light as it leaves said first optical path means;

second optical coupling means, optically connected to said first optical path means, for coupling light from a source thereof, into said first optical path means, from at least one other direction;

third optical coupling means, optically connected to said first optical path means for coupling light from said first optical path means thereof to at least one other direction of propagation;

first detector means, optically connected to said first optical coupling means, for receiving and detecting said fifth beam of light from said second beam splitting means and producing a first signal indicative of the characteristics of said fifth beam of light;

first demodulator means, connected to said first detector means, for demodulating said first frequency from said first signal;

first oscillator means, connected to said first demodulator means and to said first phase modulating means, for generating an output having a first frequency and transmitting said output to said first phase modulation means to be impressed on said third and said fourth beams of light;

fourth optical coupling means, optically connected to said first beamsplitting means, for coupling light from the path of said second beam of light to at least one other direction of propagation;

third beam splitting means, optically connected to said fourth optical coupling means, for receiving said second beam of light from said first beam splitting means, splitting said second beam of light into a sixth and a seventh beam of light, and for recombining said sixth and said seventh beams into an eighth beam of light;

second optical path means, optically connected to said third beam splitting means for directing said sixth and said seventh beams in counterpropagating directions;

frequency shifting means, optically connected to said second optical path means for affecting the optical length of said second optical path means;

second phase modulation means, optically connected to said second optical path means for impressing a second frequency on one of said sixth and said seventh beams of light as it enters said second optical path means, and for impressing a second frequency on the other of said sixth and said seventh beams of light as it leaves said second optical path means; a portion of said second optical path means occupying a portion of the physical space occupied by said first optical path means, from said third optical coupling means, to said second optical coupling means, to form a common area;

second detector means, optically connected to said fourth optical coupling means, for detecting said eighth beam of light from said third beam splitting means and producing a second signal indicative of the characteristics of said eighth beam of light;

second demodulator means, connected to said second detector means, for demodulating said second frequency from said second signal;

integration means, connected to said second demodulator means and said frequency shifting means, for generating an output representative of the integral of the demodulated said second signal, said integration means also having an intermediate output;

second oscillator means, connected to said output of said second demodulator means and to said second phase modulation means, for providing a signal to said frequency shifting means;

second oscillator means, connected to said second demodulator means and to said second phase modulating means, for generating an output having a second frequency and transmitting said output to said second phase modulation means to be impressed on said sixth and said seventh beams of light; and;

normalization means, having an input connected to said intermediate output of said integration means and to said first demodulation means, and an output, for generating an output signal indicative of the location of a disturbance in said common area of said first and said second optical path means, and for generating an output signal indicative of the severity of a disturbance in said common area of said first and said second optical path means.

44. The Optic sensor of claim 43 further comprising:
a first polarizing means, optically connected between said first optical coupling means and said second beam splitting means, for polarizing said first beam of light from said first beam splitting means; and,
a second polarizing means, optically connected between said fourth optical coupling means and said third beam splitting means, for polarizing said second beam of light from said first beam splitting means.

45. The fiber optic sensor of claim 43 wherein said light source means further comprises a light emitting diode.

46. The fiber optic sensor of claim 43 wherein said light source means further comprises a superradiant diode.

47. The fiber optic sensor of claim 43 wherein said first and said second optical path means further comprises at least one optical fiber.

48. The fiber optic sensor of claim 43 wherein said first and said second phase modulating means further comprises a plurality of acousto optical modulators.

49. The fiber optic sensor of claim 43 wherein said first, second, third, and fourth optical coupling means each further comprises a fiber optic coupler.

50. The process of detecting an environmental disturbance along a fiber optic path comprising the steps of:

generating a first beam of light;
generating a second beam of light;
splitting said first beam of light into a clockwise third beam of light and into a counterclockwise fourth beam of light in a counterpropagating fiber optic path;
phase modulating said third and said fourth beams of light near one end of their counterpropagating fiber optic path;
recombining said third and said fourth beams of light into a fifth beam of light
splitting said second beam of light into a clockwise sixth beam of light and into a counterclockwise seventh beam of light in a counterpropagating fiber optic path;
phase modulating said sixth and said seventh beams of light near one end of their counterpropagating fiber optic path;
recombining said sixth and said seventh beams of light into an eighth beam of light
detecting the momentary relative phase shift between said third and said fourth beams of light by examining said fifth beam of light;
detecting the steady state relative phase shift between said sixth and said seventh beams of light by examining said eighth beam of light.

51. The process of detecting an environmental disturbance along a fiber optic path as recited in claim 50, said examining said eighth beam of light step and said examining said fifth beam of light step further comprises measuring the interferometric fringes produced in said fifth beam and in said eighth beam.

52. The process of detecting an environmental disturbance along a fiber optic path as recited in claim 50, wherein said detecting the momentary relative phase shift step and the detecting the steady state relative phase shift step are performed simultaneously.

* * * * *